United States Patent
Dins et al.

(10) Patent No.: US 11,808,780 B1
(45) Date of Patent: Nov. 7, 2023

(54) INERTIAL SENSOR ERROR MODELING AND COMPENSATION, AND SYSTEM FOR LIFETIME INERTIAL SENSOR CALIBRATION AND NAVIGATION ENHANCEMENT

(71) Applicant: Honeywell International Inc., Charlotte, NC (US)

(72) Inventors: Carl A. Dins, Tempe, AZ (US); Markus Hans Gnerlich, Plymouth, MN (US); Patrick Duffy, Charlotte, NC (US); Andrew Stewart, Chanhassen, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/050,297

(22) Filed: Oct. 27, 2022

Related U.S. Application Data

(60) Provisional application No. 63/344,469, filed on May 20, 2022.

(51) Int. Cl.
  *G01P 21/00* (2006.01)
  *G01P 1/00* (2006.01)
  (Continued)

(52) U.S. Cl.
  CPC ............ *G01P 21/00* (2013.01); *G01P 1/006* (2013.01); *G01P 15/08* (2013.01); *G01P 15/14* (2013.01); *G06N 3/044* (2023.01)

(58) Field of Classification Search
  CPC .......... G01P 21/00; G01P 1/006; G01P 15/08; G01P 15/14; G06N 3/044
  (Continued)

(56) References Cited

U.S. PATENT DOCUMENTS

| | | | |
|---|---|---|---|
| 6,738,714 B2 | 5/2004 | McCall et al. | |
| 2016/0047675 A1* | 2/2016 | Tanenhaus | G01C 25/005 |
| | | | 702/104 |
| 2019/0135616 A1 | 5/2019 | Aggarwal et al. | |

FOREIGN PATENT DOCUMENTS

| | | |
|---|---|---|
| CN | 104897171 A | 9/2015 |
| CN | 109916388 A | 6/2019 |
| CN | 112797967 A | 5/2021 |

OTHER PUBLICATIONS

Joshi et al., "Image Deblurring Using Inertial Measurement Sensors", To appear in the ACM SIGGRAPH conference proceedings, as downloaded Jul. 12, 2022 from http://neelj.com/projects/imudeblurring/, pp. 1 through 8.

* cited by examiner

*Primary Examiner* — Aditya S Bhat
(74) *Attorney, Agent, or Firm* — Fogg & Powers LLC

(57) ABSTRACT

A method for inertial sensor error modeling and compensation comprises obtaining multiple bias drift datasets for an elapsed time period for one or more gyroscopes; generating a 3D bias drift data plot using the multiple bias drift datasets; generating a partial bias drift data image based on the 3D bias drift data plot; and inputting the partial bias drift data image into a machine learning algorithm to predict how bias drift evolves over time for the gyroscopes. The machine learning algorithm uses the partial bias drift data image, the elapsed time period, and temperature history to compute a predicted bias over temperature with respect to time, to thereby predict bias drift data for a future time period for the gyroscopes. The machine learning algorithm outputs a completed bias drift image that represents drift data from the elapsed time period and the predicted bias drift data for the future time period.

16 Claims, 7 Drawing Sheets

(51) Int. Cl.
*G06N 3/044* (2023.01)
*G01P 15/08* (2006.01)
*G01P 15/14* (2013.01)

(58) Field of Classification Search
USPC .................................................... 702/104
See application file for complete search history.

INERTIAL SENSOR ERROR MODELING AND COMPENSATION, AND SYSTEM FOR LIFETIME INERTIAL SENSOR CALIBRATION AND NAVIGATION ENHANCEMENT

CROSS REFERENCE TO RELATED APPLICATION

This application claims the benefit of priority to U.S. Provisional Application No. 63/344,469, filed on May 20, 2022, which is herein incorporated by reference.

STATEMENT REGARDING FEDERALLY SPONSORED RESEARCH OR DEVELOPMENT

This invention was made with Government support under W911QX21-C-0013 awarded by DARPA. The Government has certain rights in the invention.

BACKGROUND

Bias drift in inertial sensors such as gyroscopes causes significant performance degradation of these sensors across time in the field. In particular, lifetime bias changes in gyroscopes are a major component of uncompensated bias, and is one of the most important limiting factors of gyroscopes performance. For inertial sensor systems, this directly impacts position and heading of a vehicle for extended mission times, as the bias drift deteriorates performance of the inertial sensors over time.

SUMMARY

In one aspect, a method for inertial sensor error modeling and compensation comprises obtaining multiple bias drift datasets for an elapsed time period for one or more gyroscopes; generating a 3D bias drift data plot using the multiple bias drift datasets, the 3D bias drift data plot including bias over temperature with respect to time; generating a partial bias drift data image based on the 3D bias drift data plot, the partial bias drift data image representing drift data from the elapsed time period; and inputting the partial bias drift data image into a machine learning algorithm that is operative to predict how bias drift evolves over time for the one or more gyroscopes. The machine learning algorithm uses the partial bias drift data image, the elapsed time period, and a system temperature history to compute a predicted bias over temperature with respect to time, to thereby predict bias drift data for a future time period for the one or more gyroscopes. The machine learning algorithm outputs a completed bias drift image that represents drift data from the elapsed time period and the predicted bias drift data for the future time period.

In another aspect, a system for inertial sensor calibration comprises at least one chassis, a sensor array embedded in the at least one chassis, and at least one payload coupled to the chassis. The at least one payload includes one or more inertial sensors and one or more temperature sensors. A processor is in operative communication with the at least one payload and the sensor array. At least one inertial sensor compensation module is in operative communication with the processor, the at least one inertial sensor compensation module operative to perform inertial sensor error modeling and compensation. At least one lifetime thermal history unit is in operative communication with the at least one payload and the sensor array. The at least one lifetime thermal history unit operatively communicates with the at least one inertial sensor compensation module. The at least one lifetime thermal history unit is configured to permanently store a thermal history of the one or more inertial sensors. The thermal history is used by the at least one inertial sensor compensation module to augment performance of the one or more inertial sensors by reducing bias drift.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
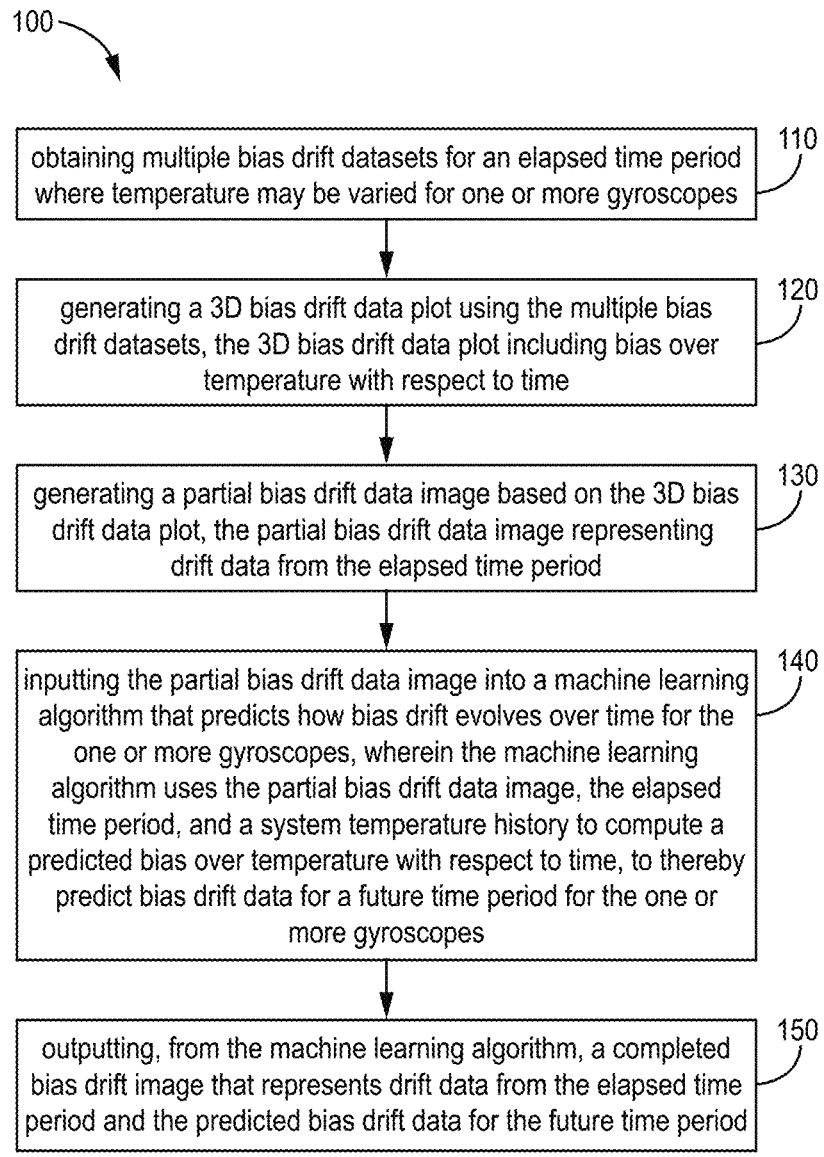
FIG. 1 is flow diagram of a method for inertial sensor error modeling and compensation, according to one implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method for inertial sensor error modeling and compensation is described herein. In addition, a system for lifetime inertial sensor calibration and navigation enhancement is described, which can employ the inertial sensor error modeling and compensation method.

The present method and system provides for calibration of inertial sensors such as gyroscopes by using machine learning or artificial intelligence (AI) approaches, such by using a recurrent neural network (RNN), image completion algorithm, or combinations thereof.

The present approach can be implemented for a standalone inertial sensor, or for multiple inertial sensors such as implemented in an inertial measurement unit (IMU), which includes a plurality of gyroscopes and accelerometers.

Examples of such inertial sensors include micro-electromechanical systems (MEMS) gyroscopes.

Further details of various embodiments are described hereafter and with reference to the drawings.

Inertial Sensor Error Modeling and Compensation

The bias drift phenomena of inertial sensors is an error mechanism that is difficult to correct through temperature-based error compensation alone. In one approach, the gyroscope bias drift problem is converted into an image completion problem, thereby enabling improved sensor performance and reliability using a predictive framework able to model the behavior of complex error mechanisms over time.

A first step of this approach is to encode drift information as an image. This is done using datasets that describe the gyroscope bias drift of a particular sensor. An example of this includes multiple bias over temperature plots across time. These plots can be formed into a three-dimensional (3D) plot that resembles a large contour map. Another way to look at these plots is to create an image where the x-axis is temperature and the y-axis is time, while a color in the image represents the gyroscope bias. The resulting image shows a gradient of color across the time axis representing how the amount and shape of the bias is changing across time.

A second step of this approach is to provide the image to a machine learning or AI algorithm designed for image completion. For a given pattern observed in the existing image, the machine learning or AI algorithm is operative to predict what the bias over temperature would look like in the future and therefore predict the drift. The second step can be augmented with field data after the original calibration data, essentially providing the equivalent of one or more pixels in the incomplete section to improve the accuracy of the image completion result.

In a baseline approach of an example implementation, simple modeling is employed that uses a polynomial or lookup table to estimate a temperature-dependent scale factor and bias based on the sensor temperature measurements. In a first machine learning or AI approach, sophisticated modeling is used to estimate scale factor and bias, using a variety of measurements. For example, a machine learning model can be trained on 15 temperature cycles and tested on 15 subsequent cycles.

In a second machine learning or AI approach, a machine learning or AI model is used for bias drift prediction by image completion. For example, 30 temperature cycles from multiple gyroscopes can be collected, and lookup table "images" are formed for each gyroscope. Given the first 15 temperature cycles, the model predicts the next 15 bias over temperature curves. The task to fill in missing (future) parts of the images is called image completion. At test time, the lookup tables are generated by the model, and a bias compensation value is linearly interpolated from temperature, cycle time, and given by the lookup tables. The lookup tables may be generated by ramp rates, but may also incorporate other variables.

Examples of suitable machine learning or AI image completion algorithms that can be adapted for use in the present methods include ImageGPT, and CoModGAN.

FIG. 1 is flow diagram of a method 100 for inertial sensor error modeling and compensation, according to one implementation. The method 100 comprises obtaining multiple bias drift datasets for an elapsed time period where the temperature may be varied for one or more gyroscopes (block 110); and generating a three-dimensional (3D) bias drift data plot using the multiple bias drift datasets (block 120). The 3D bias drift data plot includes bias over temperature with respect to time. The method 100 generates a partial bias drift data image based on the 3D bias drift data plot, with the partial bias drift data image representing drift data from the elapsed time period (block 130). The method 100 can encode the 3D bias drift plot into a two-dimensional (2D) bias drift image to generate the partial bias drift image.

The method 100 further comprises inputting the partial bias drift data image into a machine learning algorithm, such as an image completion algorithm, which is operative to predict how bias drift evolves over time for the one or more gyroscopes (block 140). For example, the machine learning algorithm can use the partial bias drift data image, the elapsed time period, and a system temperature history to compute a predicted bias over temperature with respect to time, to thereby predict bias drift data for a future time period for the one or more gyroscopes. The method 100 outputs, from the machine learning algorithm, a completed bias drift image that represents drift data from the elapsed time period and the predicted bias drift data for the future time period (block 150).

Figure 2:
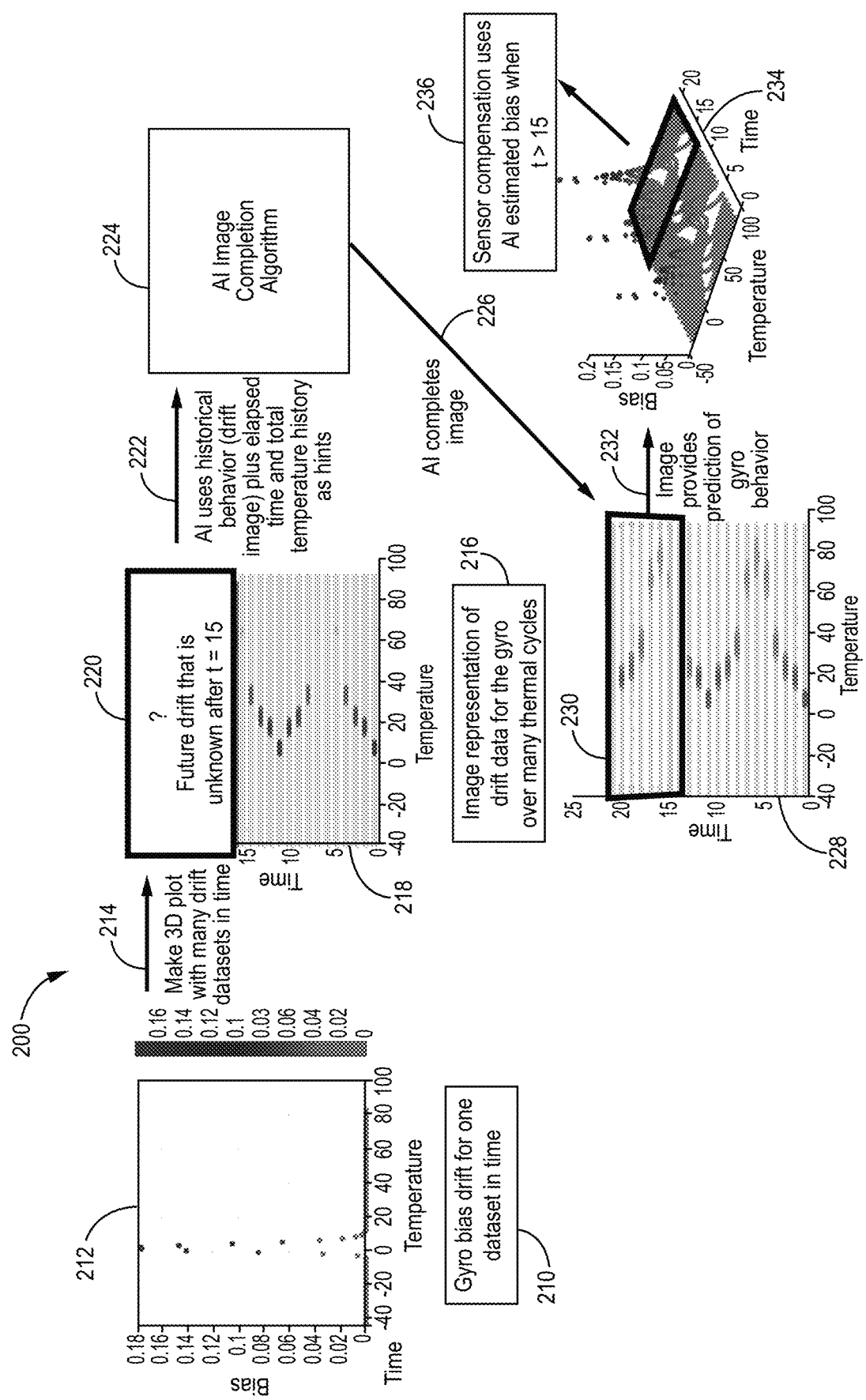
FIG. 2 is flow diagram of a method for gyroscope bias drift compensation via image completion, according to an example implementation.

FIG. 2 is flow diagram of a method 200 for gyroscope bias drift compensation via AI image completion, according to an example implementation. Initially, method 200 obtains a gyroscope bias drift for one dataset in time (block 210), which is represented here by a bias drift data plot 212 showing bias with respect to temperature at a given time (t). The method 200 makes a 3D bias data plot at 214, with many bias drift datasets in a given time period. The method 200 generates an image representation of drift data for the gyroscope over many thermal cycles (block 216), based on the 3D bias drift data plot. This is shown here as a 2D partial bias drift data image 218 for a time up to t=15, for example. There is also a future bias drift that is unknown after t=15 (block 220).

With partial bias drift data image 218, method 200 predicts drift at a future time (e.g., after t=15) by employing an AI module at 222. In one embodiment, the AI module uses gyroscope historical behavior (drift image) plus elapsed time and total temperature history as hints in executing an AI image completion algorithm 224. In another embodiment, an alternative to using the total temperature history as a hint is to use a state variable stored in nonvolatile memory. For example, the last bias and temperature reading before the device was powered-off, which is retrieved at the next power-on, can be used as hint. The AI image completion algorithm 224 can be trained at a factory to predict how drift evolves over time for a given gyroscope before it leaves the factory. The AI image completion algorithm 224 can be embedded in software with the gyroscope or as part of an IMU.

The AI image completion algorithm 224 outputs a complete image at 226, shown here as a complete bias drift data image 228, including an added AI estimated bias image representation of predicted drift data for time t greater than 15 (block 230). The complete bias drift data image 228 provides a prediction of gyroscope behavior at 232, which can be represented by a 3D bias data plot 234. A sensor compensation module can then use the AI estimated bias when time t is greater than 15 (block 236), to provide navigation corrections for the bias drift.

The present method for bias drift compensation outperforms non-predictive prior correction methods that cannot evolve over time with a sensor's history.

Lifetime Inertial Sensor Calibration

A system for lifetime inertial sensor calibration includes mechanisms for recording the lifetime thermal history and elapsed service time of the inertial sensors, and providing this information to an inertial sensor processor. As temperature changes and so-called "thermal cycling" in a power-off state of the sensors may cause changes in bias errors, the present system provides the advantage that such changes in bias errors can be compensated for since the thermal history is known. This system can be used to implement the bias compensation methods described above in the previous section, to provide for improved sensor performance and reliability.

The present system generally includes a chassis, or physical housing, for a mission payload and mission processor. The mission payload may be a six-axis inertial sensor array, and the mission processor may be in an IMU or inertial navigation system (INS) computer. The system also includes a low-power electronics module having a microprocessor (or microcontroller), a non-volatile memory, an analog-to-digital converter (ADC), and communications interface. A sensor array is embedded in the chassis, and may include temperature sensors or other sensors connected to the ADC of the low-power electronics module.

The system has two modes of operation: a full power-on payload mode, for normal operations; and a payload sleep mode, for perpetually active sensor logging. A lifetime battery is provided for the low-power electronics module during the payload sleep mode, so that logging of the sensors is perpetually active. The communications interface is provided on the low-power electronics module so the lifetime thermal history can be transmitted to the mission processor during the full power-on payload mode.

The present system employs compensation methods based on sensor lifetime models. These models can track temperature driven processes based on activation temperature, and provide the ability to self-audit extreme or adversarial environmental events. A clock is provided to keep track of elapsed service time, and low frequency logging of sensor data to non-volatile memory is provided with a battery backup.

In the full power-on payload mode, the lifetime history is loaded into volatile memory, and self-diagnostics are performed from the lifetime history (e.g., determining if maximum safe temperature is exceeded). The bias error compensation is augmented with the lifetime history. For example, the lifetime temperature can be used for temperature-based compensation of the inertial sensor payload.

In the payload sleep mode, a micropower environmental history is active, and stored in a lifetime non-volatile memory. In the payload sleep mode, the mission processor is powered down or power is removed. For field calibration, in-the-field zero-bias truth updates can be stored in lifetime memory to enhance prediction of drift.

Figure 3:
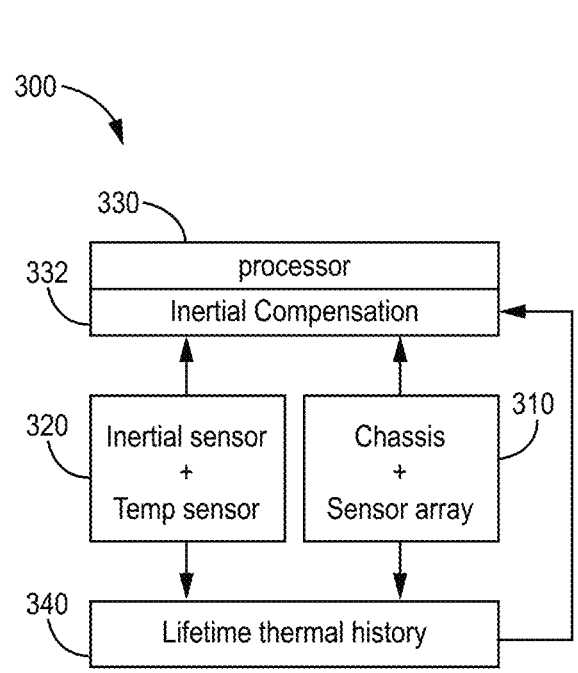
FIG. 3 is a block diagram of a system for lifetime inertial sensor calibration, according to one implementation.

FIG. 3 is a block diagram of a system 300 for lifetime inertial sensor calibration, according to one implementation. The system 300 generally includes a chassis 310 with an embedded sensor array, and a mission payload 320 including one or more inertial sensors and temperature sensors. A processor 330 is in operative communication with mission payload 320 and the embedded sensor array in chassis 310. The processor 330 includes an inertial sensor compensation module 332, which is operative to perform the bias compensation methods described above.

In one embodiment, a lifetime thermal history unit 340 is in operative communication with mission payload 320 and the embedded sensor array in chassis 310. The lifetime thermal history unit 340 also operatively communicates with inertial sensor compensation module 332. The lifetime thermal history is stored in the background by lifetime thermal history unit 340 until needed, and is used to augment performance of the inertial sensor payload. The bias compensation occurs at the system level and is augmented by the embedded sensor array and lifetime thermal history. In another embodiment, an alternative to using the lifetime thermal history is to periodically store the inertial sensor temperature (and other state variables) in nonvolatile memory that is read back at the next power-on. This would be used in place of an always-on thermal monitor with battery backup.

Figure 4:
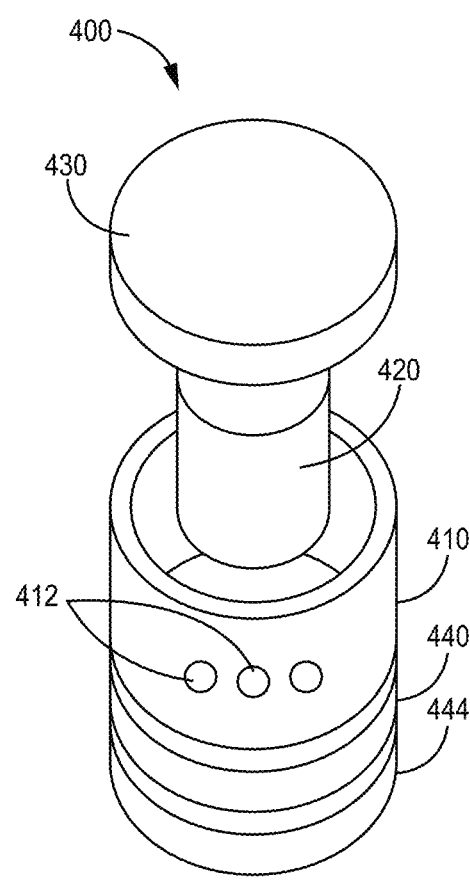
FIG. 4 is an exploded perspective view of a system for lifetime inertial sensor calibration, according to one example embodiment.

FIG. 4 illustrates an exploded perspective view of a system 400 for lifetime inertial sensor calibration, according to one example embodiment. The system 400 includes a chassis 410 with an embedded sensor array 412, and a mission payload 420 including inertial sensors and temperature sensors. The mission payload 420 can be housed in chassis 410 using a mechanical isolator such as an inertial sensor assembly. A processor 430 is operatively coupled with mission payload 420 and embedded sensor array 412. The processor 430 includes an inertial sensor compensation layer, which is operative to perform the bias compensation methods described above. A low-power electronics module 440 is operatively coupled with mission payload 420 and embedded sensor array 412. The low-power electronics module 440 includes a micropower microcontroller and a non-volatile lifetime memory for storing lifetime thermal history. A lifetime battery 444 is operatively coupled with low-power electronics module 440, for logging of sensor data during a sleep mode.

Figure 5B:
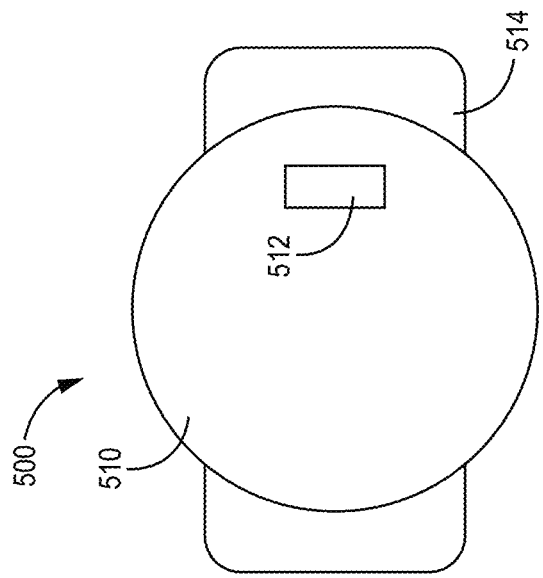
FIGS. 5B is a top view of the system of FIG. 5A.
Figure 5A:
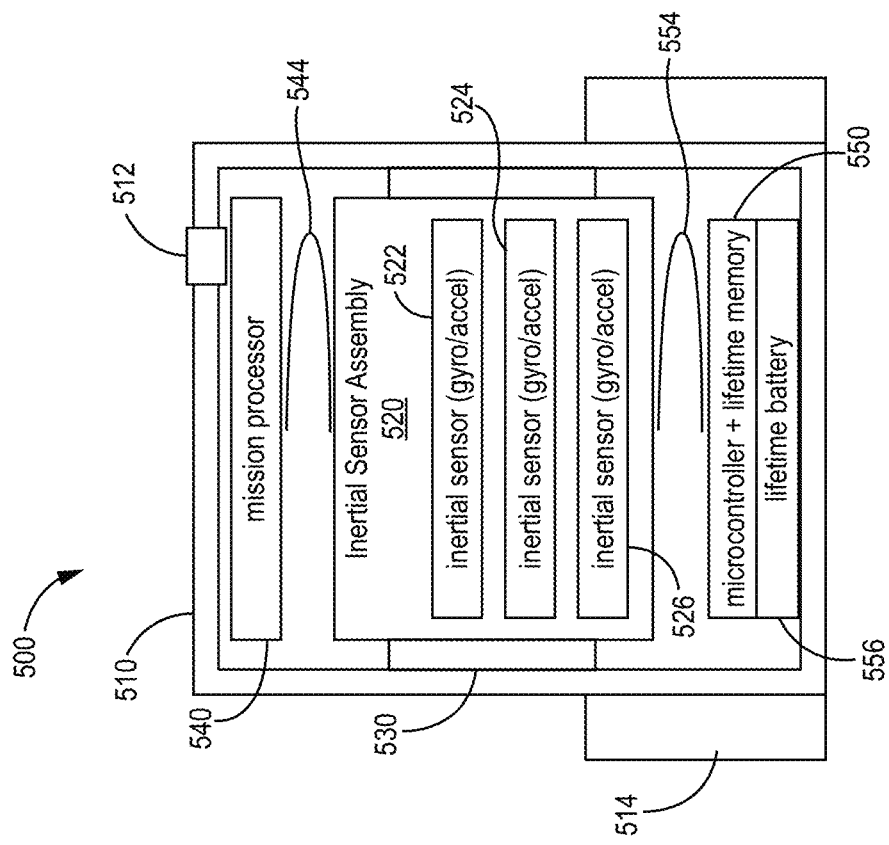
FIGS. 5A is a cross-sectional side view of a system for lifetime inertial sensor calibration, according to another example embodiment.

FIGS. 5A and 5B illustrate a system 500 for lifetime inertial sensor calibration, according to another example embodiment. The system 500 includes a chassis 510, such as a mechanical container, which houses an inertial sensor assembly 520 having a set of inertial sensors 522, 524, 526 (with gyros/accelerometers) such as an IMU. The inertial sensor assembly 520 is coupled to chassis 510 with a vibration isolator 530. A mission processor 540 is operatively coupled with inertial sensor assembly 520 such as through a flexible connector 544. The mission processor 540 includes an inertial sensor compensation layer, which is operative to perform the bias compensation methods described above.

A low-power electronics module 550 is operatively coupled with inertial sensor assembly 520 such as through a flexible connector 554. The low-power electronics module 550 includes a micropower microcontroller and a non-volatile lifetime memory for storing lifetime thermal history. A lifetime battery 556 is operatively coupled with low-power electronics module 550, for logging of sensor data during a sleep mode.

The chassis 510 includes an external connector 512 for connecting power to mission processor 540. The chassis 510 is coupled to a mounting fixture 514, which can be used to mount chassis 510 to a platform such as vehicle.

Figure 6:
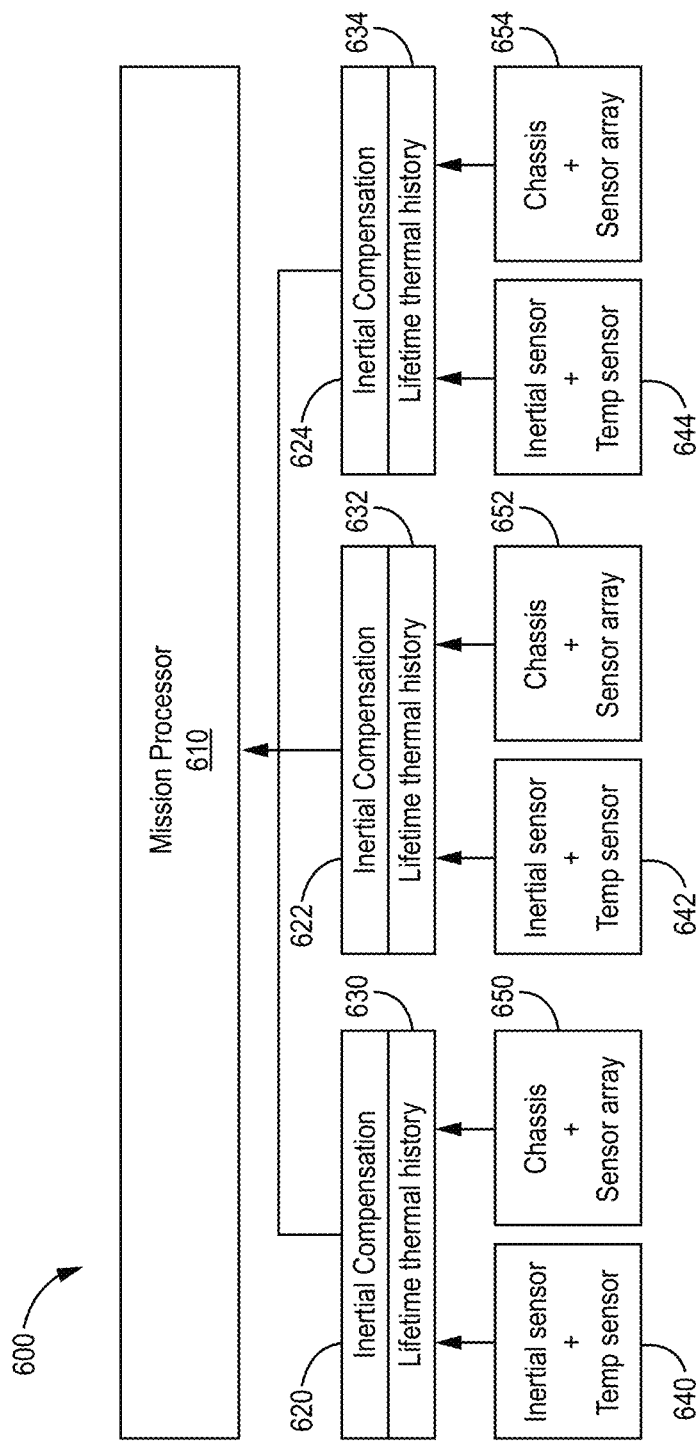
FIG. 6 is a block diagram of a system for lifetime inertial sensor calibration, according to another implementation.

FIG. 6 is a block diagram of a system 600 for lifetime inertial sensor calibration, according to another implementation. The system 600 is configured for fusion of lifetime history and compensation at the sensor level. The system 600 includes a mission processor 610 that is in operative communication with a set of inertial sensor compensation modules 620, 622, 624, and with a set of corresponding lifetime thermal history modules 630, 632, 634. The inertial sensor compensation and lifetime thermal history modules can be implemented as software on an embedded microcontroller or specialized AI system-on-chip (SOC).

The inertial sensor compensation and lifetime thermal history modules are each in operative communication with a respective set of mission payloads 640, 642, 644, which include inertial sensors and temperature sensors, and with a respective set of a chassis 650, 652, 654, which are embedded with sensor arrays. The bias compensation occurs at the sensor level and is augmented by the chassis sensor arrays and lifetime thermal histories. The mission processor 610 is operative to synthesize the compensated inertial sensors into an IMU.

Figure 7:
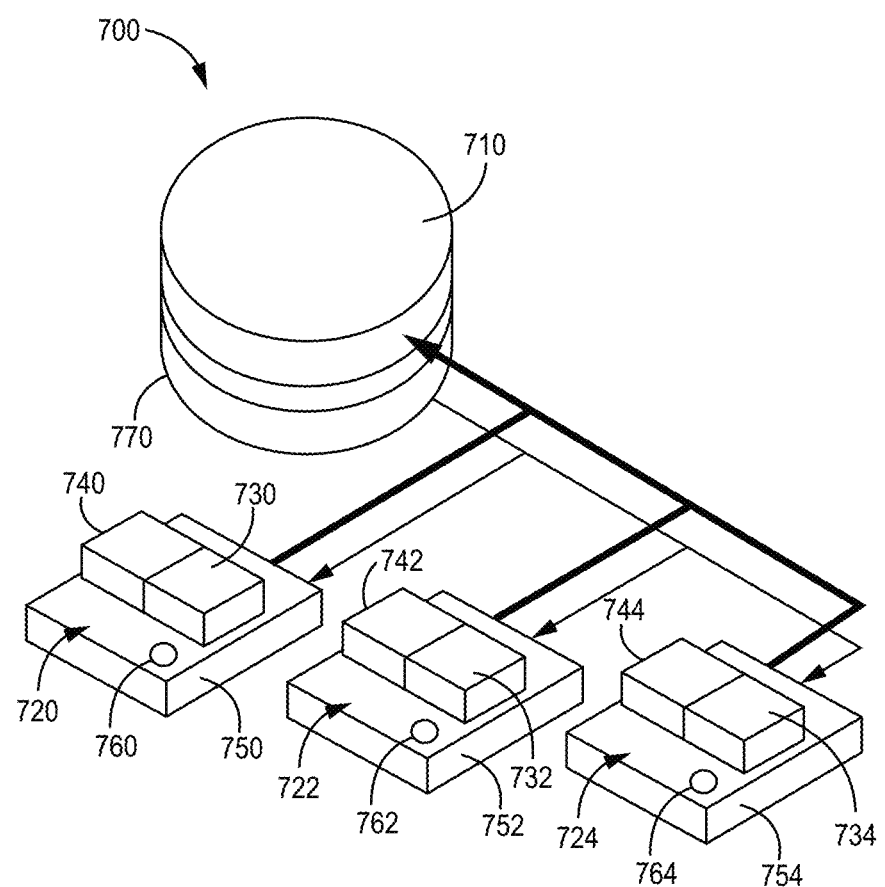
FIG. 7 is a perspective view of a system for lifetime inertial sensor calibration, according to another example embodiment.

FIG. 7 illustrates a perspective view of a system 700 for lifetime inertial sensor calibration, according to another example embodiment, which is configured for fusion of lifetime history and compensation at the sensor level. The system 700 includes a mission processor 710 that is in operative communication with a set of AI SOC devices 720, 722, 724, which respectively include a set of inertial sensor compensation and lifetime thermal history modules 730, 732, 734. The inertial sensor compensation and lifetime thermal history modules 730, 732, 734 can be implemented as software on respective AI SOC devices 720, 722, 724. The inertial sensor compensation and lifetime thermal history modules 730, 732, 734 are operatively coupled to a respective set of mission payloads 740, 742, 744, which include inertial sensors and temperature sensors, and with a respective set of a chassis 750, 752, 754, which are embedded with respective sensors 760, 762, 764. A lifetime battery 770 is operatively coupled with lifetime thermal history modules 730, 732, 734 through respective chassis 750, 752, 754.

Figure 8:
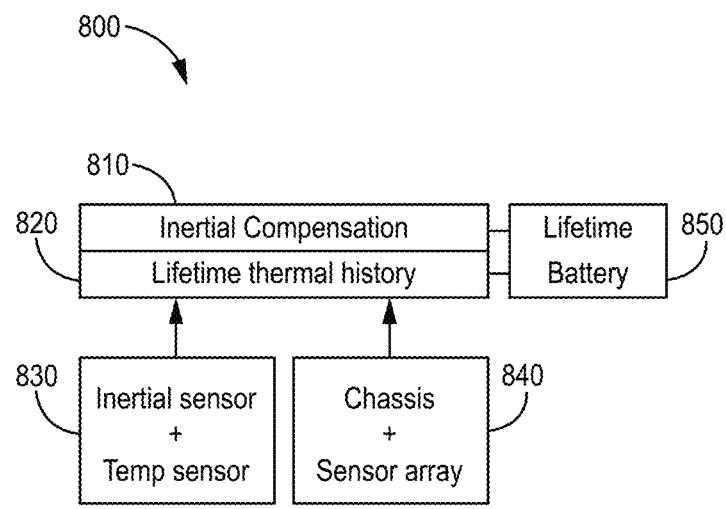
FIG. 8 is a block diagram of a system for lifetime inertial sensor calibration, according to a further implementation.

FIG. 8 is a block diagram of a system 800 for lifetime inertial sensor calibration, according to a further implementation. The system 800 is configured as a standalone inertial sensor solution, which includes fusion of lifetime history and AI compensation. The system 800 includes an inertial sensor compensation module 810, and a lifetime thermal history module 820. The inertial sensor compensation module 810 and lifetime thermal history module 820 can be implemented as software on an embedded microcontroller or specialized AI SOC.

The inertial sensor compensation module 810 and lifetime thermal history module 820 are in operative communication with a mission payload 830, which includes one or more inertial sensors and temperature sensors, and with a chassis 840, which is embedded with a sensor array. In this embodiment, chassis 840 can be a mechanical assembly, a printed circuit board, or co-packaged microchips. In addition, a lifetime battery 850 is operatively coupled with inertial sensor compensation module 810 and lifetime thermal history module 820.

Figure 9:
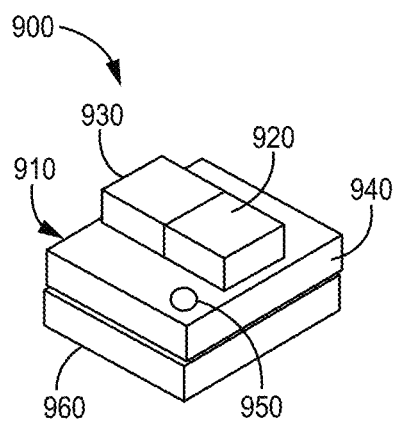
FIG. 9 is a perspective view of a system for lifetime inertial sensor calibration, according to a further example embodiment.

FIG. 9 illustrates a perspective view of a system 900 for lifetime inertial sensor calibration, according to a further example embodiment, which is configured as a standalone inertial sensor solution. The system 900 comprises an AI SOC device 910, which includes an inertial sensor compensation and lifetime thermal history module 920. The inertial sensor compensation and lifetime thermal history module 920 can be implemented as software on AI SOC device 910. The inertial sensor compensation and lifetime thermal history module 920 is operatively coupled to a mission payload 930, which includes one or more inertial sensors and temperature sensors, and with a chassis 940, which is embedded with a sensor array 950. The sensor array 950 can include an electromagnetic interference (EMI) sensor that may sense a hostile environment (e.g., jamming), which is part of an inertial confidence rating. A lifetime battery 960 is operatively coupled with lifetime thermal history module 920 through chassis 940.

In an alternative embodiment, system 900 can be implemented without battery 960, by having the sensor state stored in a nonvolatile memory such as located in lifetime thermal history module 920.

The processing unit and/or other computational devices used in the method and system described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a method for inertial sensor error modeling and compensation, the method comprising: obtaining multiple bias drift datasets for an elapsed time period for one or more gyroscopes; generating a three-dimensional (3D) bias drift data plot using the multiple bias drift datasets, the 3D bias drift data plot including bias over temperature with respect to time; generating a partial bias drift data image based on the 3D bias drift data plot, the partial bias drift data image representing drift data from the elapsed time period; inputting the partial bias drift data image into a machine learning algorithm that is operative to predict how bias drift evolves over time for the one or more gyroscopes, wherein the machine learning algorithm uses the partial bias drift data image, the elapsed time period, and a system temperature history to compute a predicted bias over temperature with respect to time, to thereby predict bias drift data for a future time period for the one or more gyroscopes; and outputting, from the machine learning algorithm, a completed bias drift image that represents drift data from the elapsed time period and the predicted bias drift data for the future time period.

Example 2 includes the method of Example 1, further comprising: encoding the 3D bias drift data plot into a two-dimensional (2D) bias drift image to generate the partial bias drift image.

Example 3 includes the method of any of Examples 1-2, wherein the machine learning algorithm is implemented by a recurrent neural network (RNN).

Example 4 includes the method of any of Examples 1-3, wherein the machine learning algorithm comprises an image completion algorithm.

Example 5 includes a system for inertial sensor calibration, the system comprising: at least one chassis; a sensor array embedded in the at least one chassis; at least one payload coupled to the chassis, the at least one payload including one or more inertial sensors and one or more temperature sensors; a processor in operative communication with the at least one payload and the sensor array; at least one inertial sensor compensation module in operative communication with the processor, the at least one inertial sensor compensation module operative to perform inertial sensor error modeling and compensation; and at least one lifetime thermal history unit in operative communication with the at least one payload and the sensor array, wherein the at least one lifetime thermal history unit operatively communicates with the at least one inertial sensor compensation module; wherein the at least one lifetime thermal history unit is configured to permanently store a thermal history of the one or more inertial sensors, wherein the thermal history is used by the at least one inertial sensor compensation module to augment performance of the one or more inertial sensors by reducing bias drift.

Example 6 includes the system of Example 5, wherein the at least one inertial sensor compensation module includes a machine learning algorithm operative to predict how bias drift evolves over time for the one or more inertial sensors.

Example 7 includes the system of Example 6, wherein the machine learning algorithm is implemented by a recurrent neural network (RNN).

Example 8 includes the system of any of Examples 6-7, wherein the machine learning algorithm comprises an image completion algorithm.

Example 9 includes the system of any of Examples 5-8, wherein the chassis comprises a mechanical assembly, a printed circuit board, or co-packaged microchips.

Example 10 includes the system of any of Examples 5-8, wherein the chassis comprises an artificial intelligence (AI) system-on-chip (SOC).

Example 11 includes the system of any of Examples 5-10, wherein the one or more inertial sensors include one or more gyroscopes.

Example 12 includes the system of any of Examples 5-10, wherein the one or more inertial sensors include multiple gyroscopes and accelerometers implemented in an inertial sensor assembly of an inertial measurement unit (IMU).

Example 13 includes the system of any of Examples 5-12, wherein the at least one lifetime thermal history unit comprises a low-power electronics module including a microcontroller, and a non-volatile memory.

Example 14 includes the system of Example 13, further comprising a lifetime battery operatively coupled with the low-power electronics module.

Example 15 includes the system of any of Examples 5-14, wherein: a first operational mode of the system includes a full power-on payload mode, for active system operations; and a second operational mode of the system includes a payload sleep mode, for perpetually active sensor logging.

Example 16 includes a system for inertial sensor calibration, the system comprising: a plurality of chassis each embedded with one or more sensors; a plurality of payloads each coupled to a respective chassis, the payloads each including one or more inertial sensors and one or more temperature sensors; a processor in operative communication with the payloads and the one or more sensors; a plurality of inertial sensor compensation and lifetime thermal history modules in operative communication with the processor; and a lifetime battery operatively coupled with the inertial sensor compensation and lifetime thermal history modules; wherein the inertial sensor compensation and lifetime thermal history modules are configured to permanently store a thermal history of each of the one or more inertial sensors, wherein the thermal history is used by the inertial sensor compensation and lifetime thermal history modules to augment performance of each of the one or more inertial sensors by reducing bias drift.

Example 17 includes the system of Example 16, wherein the inertial sensor compensation and lifetime thermal history modules each includes a machine learning algorithm operative to predict how bias drift evolves over time for each of the one or more inertial sensors.

Example 18 includes the system of Example 17, wherein the machine learning algorithm is implemented by a recurrent neural network (RNN).

Example 19 includes the system of any of Examples 16-18, wherein the one or more inertial sensors include one or more gyroscopes.

Example 20 includes the system of any of Examples 16-18, wherein the one or more inertial sensors include multiple gyroscopes and accelerometers implemented in an inertial measurement unit (IMU).

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. A system for inertial sensor calibration, the system comprising:
  at least one chassis;
  a sensor array embedded in the at least one chassis;
  at least one payload coupled to the chassis, the at least one payload including one or more inertial sensors and one or more temperature sensors;
  a processor in operative communication with the at least one payload and the sensor array;
  at least one inertial sensor compensation module in operative communication with the processor, the at least one inertial sensor compensation module operative to perform inertial sensor error modeling and compensation; and at least one lifetime thermal history unit in operative communication with the at least one payload and the sensor array, wherein the at least one lifetime thermal history unit operatively communicates with the at least one inertial sensor compensation module;

wherein the at least one lifetime thermal history unit is configured to permanently store a thermal history of the one or more inertial sensors, wherein the thermal history is used by the at least one inertial sensor compensation module to augment performance of the one or more inertial sensors by reducing bias drift.

2. The system of claim 1, wherein the at least one inertial sensor compensation module includes a machine learning algorithm operative to predict how bias drift evolves over time for the one or more inertial sensors.

3. The system of claim 2, wherein the machine learning algorithm is implemented by a recurrent neural network (RNN).

4. The system of claim 2, wherein the machine learning algorithm comprises an image completion algorithm.

5. The system of claim 1, wherein the chassis comprises a mechanical assembly, a printed circuit board, or co-packaged microchips.

6. The system of claim 1, wherein the chassis comprises an artificial intelligence (AI) system-on-chip (SOC).

7. The system of claim 1, wherein the one or more inertial sensors include one or more gyroscopes.

8. The system of claim 1, wherein the one or more inertial sensors include multiple gyroscopes and accelerometers implemented in an inertial sensor assembly of an inertial measurement unit (IMU).

9. The system of claim 1, wherein the at least one lifetime thermal history unit comprises a low-power electronics module including a microcontroller, and a non-volatile memory.

10. The system of claim 9, further comprising a lifetime battery operatively coupled with the low-power electronics module.

11. The system of claim 1, wherein:
a first operational mode of the system includes a full power-on payload mode, for active system operations; and
a second operational mode of the system includes a payload sleep mode, for perpetually active sensor logging.

12. A system for inertial sensor calibration, the system comprising:
a plurality of chassis each embedded with one or more sensors;
a plurality of payloads each coupled to a respective chassis, the payloads each including one or more inertial sensors and one or more temperature sensors;
a processor in operative communication with the payloads and the one or more sensors;
a plurality of inertial sensor compensation and lifetime thermal history modules in operative communication with the processor; and
a lifetime battery operatively coupled with the inertial sensor compensation and lifetime thermal history modules;
wherein the inertial sensor compensation and lifetime thermal history modules are configured to permanently store a thermal history of each of the one or more inertial sensors, wherein the thermal history is used by the inertial sensor compensation and lifetime thermal history modules to augment performance of each of the one or more inertial sensors by reducing bias drift.

13. The system of claim 12, wherein the inertial sensor compensation and lifetime thermal history modules each includes a machine learning algorithm operative to predict how bias drift evolves over time for each of the one or more inertial sensors.

14. The system of claim 13, wherein the machine learning algorithm is implemented by a recurrent neural network (RNN).

15. The system of claim 12, wherein the one or more inertial sensors include one or more gyroscopes.

16. The system of claim 12, wherein the one or more inertial sensors include multiple gyroscopes and accelerometers implemented in an inertial measurement unit (IMU).

* * * * *